United States Patent [19]

Hammond et al.

[11] 3,900,672

[45] Aug. 19, 1975

[54] PROCESS FOR COATING AN OPTICAL MATERIAL AND THE RESULTING PRODUCT

[75] Inventors: Vivan Joseph Hammond, London; Peter Norgate, Middlesex, both of England; Fumio Onoki, Tokorosawa, Japan; Hajime Kamiya; Kazuaki Ohno, both of Tokyo, Japan

[73] Assignee: Hoya Lens Co., Ltd., Tokyo, Japan

[22] Filed: Apr. 4, 1973

[21] Appl. No.: 347,824

[52] U.S. Cl. .... 428/334; 351/62; 428/429; 427/165
[51] Int. Cl................. B32b 17/06; C03c 17/28
[58] Field of Search ........... 117/33.3, 124 D, 124 F, 117/161 ZA, 161 UZ, 138.8 A, 101; 106/2, 106/13; 260/33.4 R, 33.4 PQ

[56] References Cited
UNITED STATES PATENTS

| | | | |
|---|---|---|---|
| 3,000,758 | 9/1961 | Hennemann et al. | 117/161 X |
| 3,515,579 | 6/1970 | Shepherd et al. | 106/13 |
| 3,650,814 | 3/1972 | Elder | 117/161 X |
| 3,676,203 | 7/1972 | Sachs et al. | 117/138.8 X |
| 3,729,339 | 4/1973 | Kiel et al. | 117/124 X |

*Primary Examiner*—Ralph Husack
*Assistant Examiner*—Sache L. Childs
*Attorney, Agent, or Firm*—Hill, Gross, Simpson, Van Santen, Steadman, Chiara & Simpson

[57] ABSTRACT

A process for improving the property of the surface of an optical material by coating the surface with a mixture comprising 25 to 70% by weight of polyacrylic acid, 0.5 to 10% by weight of hexamethoxy methylmelamine, 0.1 to 2% by weight of -aminopropyltriethoxysilane 0.01 to 0.1% by weight of polyethylene glycol fatty acid ester and 25 to 75% by weight of a solvent, drying and hardening the coating at a temperature of 50°C to 150°C.

2 Claims, No Drawings

PROCESS FOR COATING AN OPTICAL MATERIAL AND THE RESULTING PRODUCT

The present invention relates to a process for improving the property of the surface of an optical material such as a light-permeable spectacle lens, window, inspection door of a refrigerator or freezer, windscreen, ocular for optical appliances and instruments, reflector and mirror, which are respectively made of plastics or glass, or a reflector and mirror which are respectively composed of polished metal surfaces by providing a coating on the surface.

In general, when the optical material is suddenly moved from the interior of an atmosphere at a temperature below the dew point to the interior of an atmosphere at a high humidity and at a temperature above the dew point, water vapor in the latter atmosphere is abruptly cooled and condensed, and adheres to the surface of the optical material in the form of innumerable fine water droplets. Scattering of light arises on account of the water droplets, to degrade the light transmitting or reflecting property of the optical material. As is also well known, the water droplets do not disappear before the temperature of the optical material to which they adhere rises to the temperature of the new atmosphere.

In order to reduce the influence by the above phenomenon as much as possible many methods have heretofore been adopted as follows:

(a) An agent or material diminishing the surface tension, such as a surface active agent, is coated on the surface of the optical material, to diffuse the water droplets. (b) The optical material has a double structure, and air is sealed into the intermediate space, to lower the thermal conductivity and thus prevent the water vapor from being condensed. (c) A transparent and electrically conductive coating is provided on the surface of the optical material, or a resistance heating body such as very fine nichrome wire is attached thereto, so as to conduct electrical heating.

However, the method (a) rather lowers the property of the optical material because, when the coating dissolves in water and flows or when it dries, it is turned into white crystalline particles. As regards the method (b), the optical material becomes large in size due to the structure. Moreover, the phenomenon of irregular reflected light rays as is attributable to the double structure of the reflecting surface occurs. Although the method (c) is effective to some extent, it still gives rise to some degradation in the optical property, and in addition, an external power supply is necessary. Therefore, all the prior-art methods have such disadvantages, and accordingly none have been satisfactory measures.

In order to eliminate the various disadvantages of the prior art and to obtain an optical material having a surface which can endure a permanent use without exerting any influence on the optical property and by maintaining satisfactory light permeability, aeration resisting property and water resisting property over a long period of time the present invention was made. An object of the present invention is to provide a method of applying an antisweat or clouding preventing coating on the surface of the optical material.

With notice taken of the fact that, among a variety of organic high polymers, a mixture consisting of polyacrylic acid

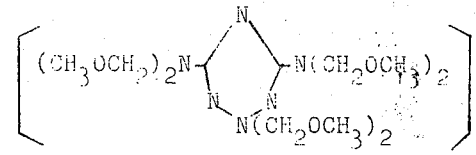

and hexamethoxymelamine $$\left[ (CH_3OCH_2)_2N-\underset{\underset{N(CH_2OCH_3)_2}{\mid}}{\overset{N}{\underset{\mid}{C}}}-N(CH_2OCH_3)_2 \right]$$

has the property of increasing the quasi-hydrophilic property of the polyacrylic acid and strengthening bonding of the hexamethoxymethylmelamine with the surface of an optical material, the present invention coats the mixture on the surface of the optical material in order to accomplish the above-mentioned object.

More specifically, 25 – 70% by weight of polyacrylic acid having a molecular weight of $3,000 - 14 \times 10^6$ and 0.5 – 10% by weight of hexamethoxymethylmelamine having a molecular weight of 390 are well mixed. Thereafter, the mixture is diluted with 25 – 75% by weight of the solvent, 2-ethoxyethanol ($CH_2OHCH_2OC_2H_5$).

In this case, total percentage by weight is always 100%. Further, the mixed solution in which a very small amount (approximately 0.01 – 0.1% by weight based on the weight of the diluted solution) of the surfactant, polyethylene glycol fatty acid ester $RCO(OCH_2CH_2)_n OH$ is coated on the surface of the optical material by either a dipping method (in which, the whole of the optical material is immersed in the mixed solution and taken out of it), or a spraying method (in which, the mixed solution is sprayed on the surface of the optical material by a sprayer) or by a spinning method (which is illustrated in Example 1). The polyethylene glycol fatty acid ester is a non-ion surfactant used as a flow agent which promotes adherence of the diluted solution to the surface of the optical material. Experiments have revealed that, in order to produce a uniform and firm coating, the spinning method is the most suitable of the above-mentioned methods.

The coating of a thickness of $10 - 1,000\mu$ as thus applied on the surface of the optical material using the mixed solution which consists of polyacrylic acid, hexamethoxymethylmelamine and 2-ethoxy-ethanol, is subjected to a drying and hardening treatment at a temperature of 50°– 150°C by means of a dryer employing an infrared ray lamp or nichrome wire heater.

In this case, when the treating temperature is excessively low, the hydrophilic property of the coating increases. Accordingly, the coating is soft being prone to flaws, being poor in adherent property to the surface of the optical material and is low in durability. When, in contrast, the temperature is excessively high, the close adherence of the coating to the surface of the optical material is really enhanced, but the clouding preventing property is poor. The temperature of 50° – 150°C is accordingly the optimum one for the drying and hardening treatment. If the molecular weight of the polyacrylic acid is small, it is necessary to lower the heating temperature.

With the foregoing treating method, there is attained an optical component having a surface which keeps the light transmitting property, aeration resisting property, water resisting property and clouding preventing property, and which is the most appropriate for permanent use.

In order to obtain a more firm coating, an epoxyresin PZ.985E, trade name, Ciba, Swiss, and its hardener HZ.985E, (trade name, Ciba, Swiss) or Silane A-1100 (trade name, Union Carbite, U.S.A.) that is γ-aminopropyl-triethoxysilane $NH_2(CH_2)_3Si(OC_2H_5)_3$ is diluted with the same amount of toluene $CH_3C_6H_5$. Thereafter, the mixed solution thus prepared is coated on the surface of an optical material to a thickness of 1 – 10μ by any one of the immersion method, the spraying method or the spinning method. As in the foregoing, the coating is dried in a dryer at a heating temperature of 50°– 150°C. Thereafter, the coating previously stated and constituted of the mixed solution consisting of polyacrylic acid, hexamethoxymethylmelamine and 2-ethoxyethanol is coated onto the dried coating to a thickness of 10 – 1,000μ by a method as in the foregoing, and is subjected to the drying and hardening treatment.

The invention will be described hereunder in connection with a few examples thereof.

EXAMPLE 1

A mixed solution was prepared which contained 28% by weight of polyacrylic acid having a degree of polymerization of approximately 1,000 (an average molecular weight of $75 \times 10^3$), 5% by weight of hexamethoxymelamine, 66% by weight of 2-ethoxyethanol, a very small amount of γ-aminopropyl-triethoxysilane and approximately 0.1% by weight of surfactant polyethylene glycol fatty acid ester. On the other hand, a mixed solution consisting of 200cc of diluent (water) and 5% by weight of γ-aminopyltriethoxysilane was separately prepared. In this case, total percentages by weight is always 100%. An optical material previously cleaned was immersed in the second-mentioned mixed solution for about 5 minutes, and then taken out. Subsequently, as a spinner a high-speed rotating table was rotated with the optical material placed thereon, the optical material was further cleaned with 2-ethoxyethanol, whereupon the first-mentioned mixed solution was dropped on the surface of the optical material so as to be diffused and coated over the entire area. Further, the spinner was rotated at a speed of 1.500 r.p.m. for about 45 seconds, to remove unnecessary parts of the dropped solution. Thereafter, the drying and hardening treatment of the coating was carried out in a dryer at a heating temperature of 150°C for about 4 hours.

EXAMPLE 2

While a spinner with an optical material placed thereon was rotated at a speed of approximately 1,000 r.p.m., the optical material was preheated by an infrared ray lamp (125 watts, spaced by approximately 5cm) for about 30 seconds, whereupon a mixed solution containing 43% by weight of polyacrylic acid of a degree of polymerization of 1,000, 7% by weight of hexamethoxymethylmelamine 50% by weight of a mixed liquid consisting of ethyl alcohol and ethylene glycol and a very small amount of the polyethylene gylcol fatty acid ester was dropped on the surface of the optical material. In this case total percentage by weight of the mixed solution is always 100%. A coating thus formed of the mixed solution dropped, was subjected to a drying and hardening treatment at a temperature of 80°C for about 30 minutes. Subsequently, the coating was further subjected to a drying and hardening treatment at a temperature of 100°C for about 10 minutes.

EXAMPLE 3

A mixed solution containing 49% by weight of polyacrylic acid of a degree of polymerization of 1,000, 0.7% by weight of hexamethoxymethylmelamine, 0.7% by weight of γ-aminopropyl triethoxylane, 49% by weight of monoethyl ether and a very small amount of surfactant the polyethylene glycol fatty acid ester was further stuck onto the coating according to Example 1, by a method similar to that for the above coating. In this case, total percentage by weight of the mixed solution is always 100%. Thereafter, a drying treatment was conducted by means of a dryer at a heating temperature of 150°C for 90 minutes.

All the thicknesses of the coatings in Examples 1 to 3 were made to be 10 – 1,000μ.

The optical material with the surfaces thus coated were cooled in a refrigerator to 0°C, whereupon they were rapidly exposed into an atmosphere at a relative humidity of 70 – 90% at a temperature of 30°C. Then, the phenomenon in which water droplets adhere to give rise to clouding was not observed on the surfaces of the optical material. Changes in the optical property i.e., a change in transparency and a change in the reflection factor were not noted at all, either.

Furthermore, even when rubbed with a piece of cloth, the components had quite no flaw caused on their surfaces. It also became clear that, even if the materials were immersed in warm water at 40°C for 1 hour and then taken out, the coatings did not exfoliate at all, and no change occurred in transparency etc.

What is claimed is:

1. A process for improving the property of the surface of an optical material by providing a coating mixture comprising 25 to 70% by weight of polyacrylic acid, 0.5 to 10% by weight of hexamethoxymethylmelamine, 0.1 to 2% by weight of γ-aminopropyl triethoxysilane, 0.01 to 0.1% by weight of polyethylene glycol fatty acid ester and 25 to 75% by weight of a solvent selected from the group consisting of 2-ethoxyethanol, ethyl alcohol, ethylene glycol, monoethyl ether and a mixed solution of two or more thereof, based on the weight of the mixture, the sum of the percentages being 100%, coating the surface of the optical material with said mixture by a spinning method and drying and hardening the coating at a heating temperature of 50°C to 150°C to form a coating having a thickness of 10μ to 1,000μ.

2. The optical material improved by the process according to claim 1.

* * * * *